United States Patent [19]

Good

[11] 3,838,963

[45] Oct. 1, 1974

[54] MOLD FOR LUNCHEON DOUGH

[75] Inventor: Paul F. Good, Lutherville, Md.

[73] Assignee: Speedco, Inc., Baltimore, Md.

[22] Filed: Apr. 3, 1972

[21] Appl. No.: 240,598

Related U.S. Application Data

[62] Division of Ser. No. 40,135, May 28, 1970, Pat. No. 3,688,682.

[52] U.S. Cl. ............................... 425/470, 249/121
[51] Int. Cl. ............................................. B28b 7/26
[58] Field of Search ........... 249/116, 117, 118, 119, 249/121, 131, 143; 99/349, 351; 100/219; 141/263, 392; 425/252, 256

[56] References Cited
UNITED STATES PATENTS

| 776,776 | 12/1904 | Dietz | 249/121 X |
|---|---|---|---|
| 1,432,161 | 10/1922 | Demuth | 99/349 |
| 1,896,849 | 2/1933 | Newman | 249/121 X |
| 2,071,845 | 2/1937 | Kowalski | 249/121 X |
| 2,165,712 | 7/1939 | Lawrence | 249/118 X |
| 2,166,560 | 7/1939 | Schmelzer | 249/121 X |
| 2,597,592 | 5/1952 | Minder | 99/349 |
| 2,665,822 | 1/1954 | Crawford | 99/349 |
| 2,805,788 | 9/1957 | Allbright | 99/349 |
| 2,932,386 | 4/1960 | Ushkow | 249/121 X |
| 2,946,207 | 7/1960 | Hulterstrum | 249/121 X |
| 3,017,822 | 1/1962 | Hawley | 100/219 X |
| 3,104,665 | 9/1963 | Towns | 249/121 X |
| 3,374,982 | 3/1968 | Sallade | 249/121 |
| 3,385,205 | 5/1968 | McCloud | 249/121 X |
| 3,414,229 | 12/1968 | Norberg | 249/121 |
| 3,604,339 | 9/1971 | Beck | 99/349 |

*Primary Examiner*—J. Spencer Overholser
*Assistant Examiner*—John S. Brown
*Attorney, Agent, or Firm*—Frederick W. Turnbull

[57] ABSTRACT

An apparatus for filling food products into molds by a stuffing horn that extends completely within a mold and feeds the food product into the mold as it is retracted. A close-fitting cover plate is then put on the mold while the stuffing horn holds the food product in the mold under pressure.

1 Claim, 17 Drawing Figures

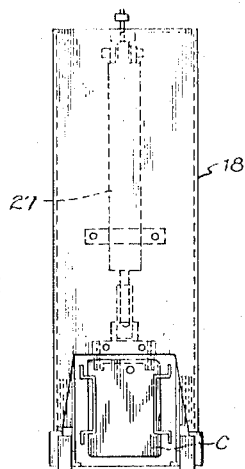
Fig. 2
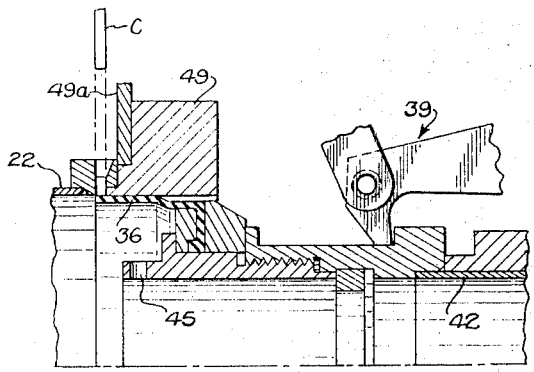
Fig. 4b
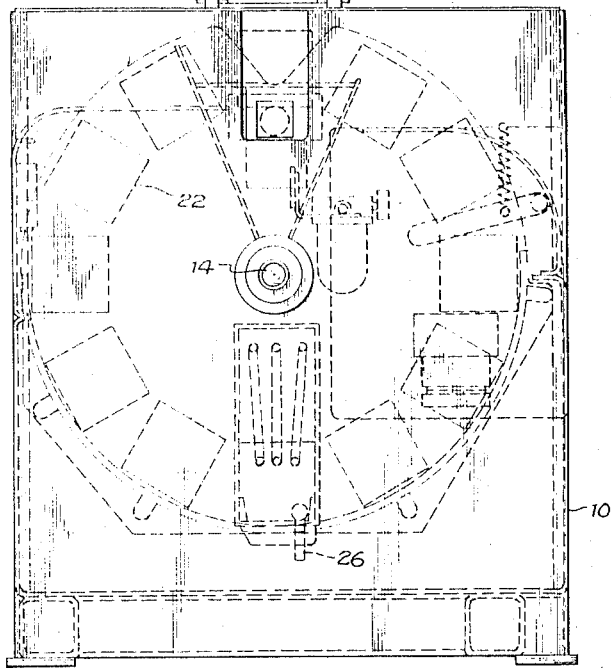
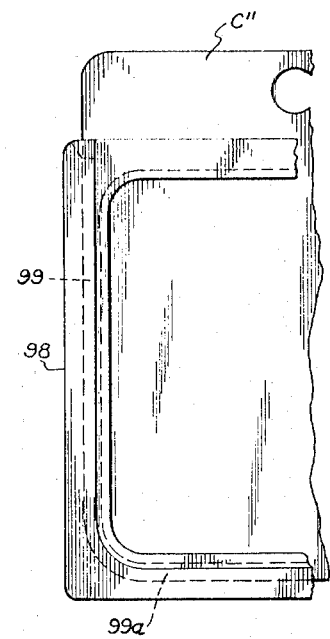
Fig. 12
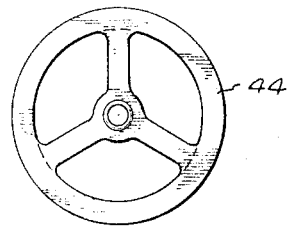
Fig. 4a

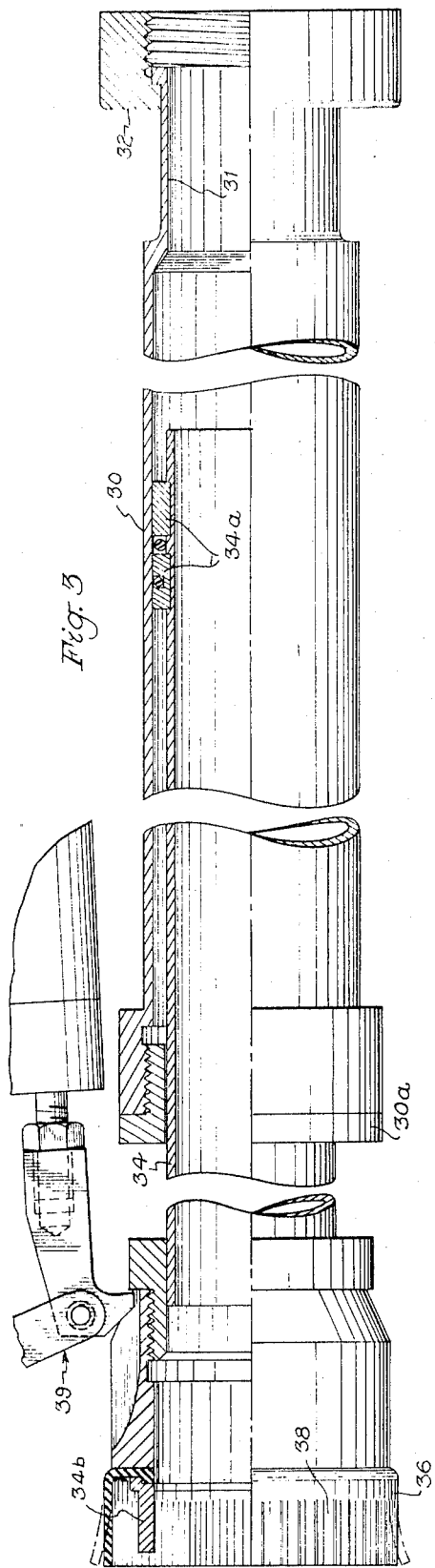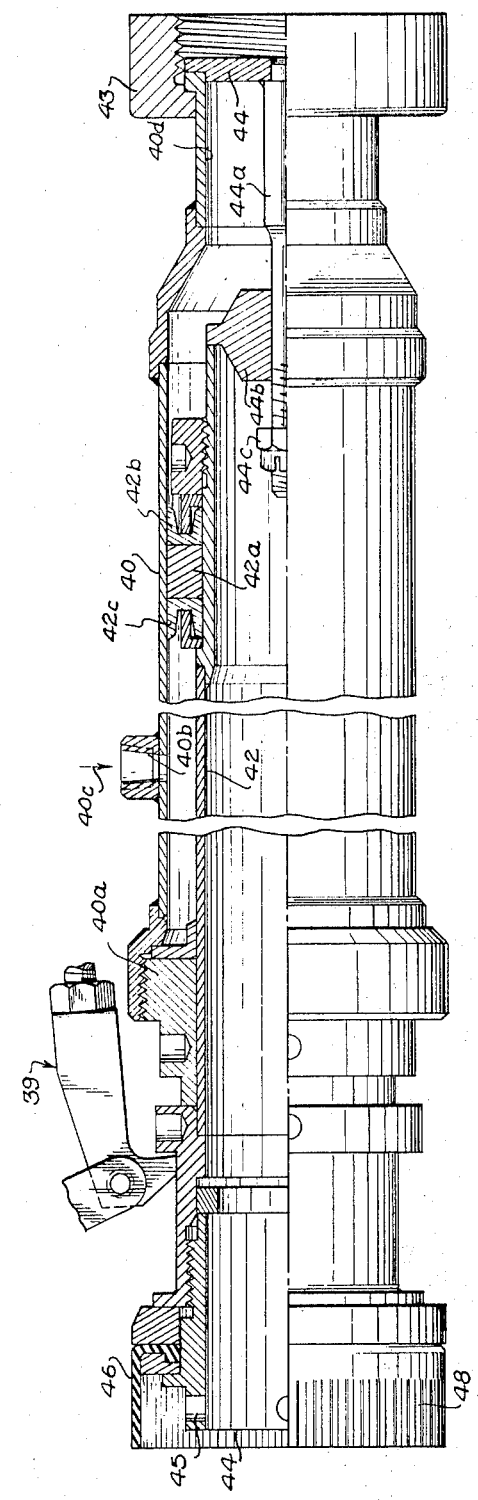
Fig. 3
Fig. 4

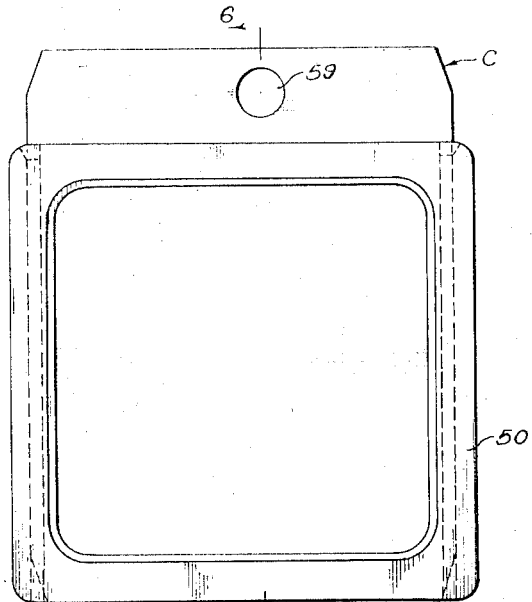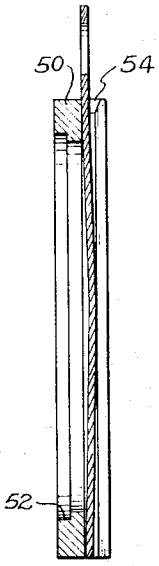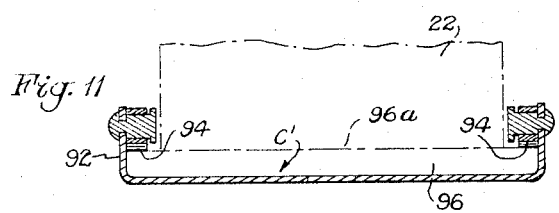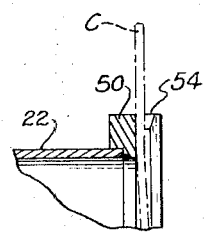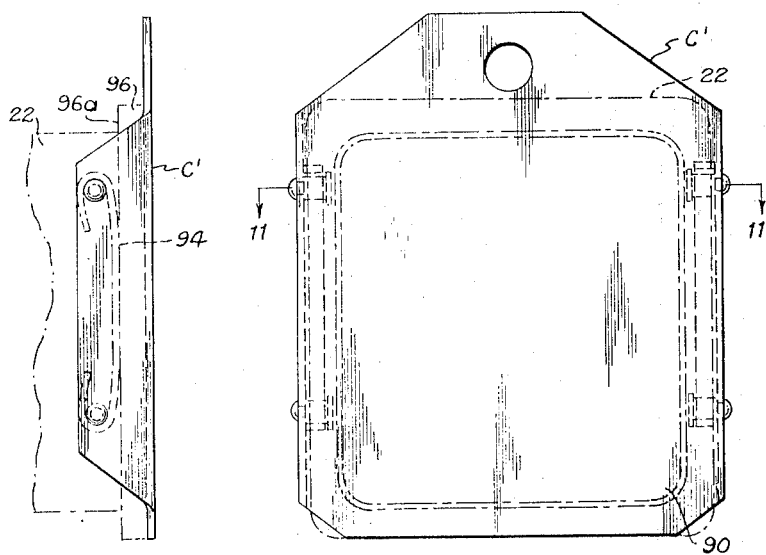

MOLD FOR LUNCHEON DOUGH

This is a divisional application of application Ser. No. 40,135 filed May 25, 1970 now U.S. Pat. No. 3,688,682.

The present invention relates to an apparatus for filling food products into molds for subsequent processing and, in particular, to an automatic machine for spraying mold release oil into the molds, automatically filling the molds and automatically positioning tight fitting lids onto molds while holding the molds under pressure; such that after cooking and chilling, uniformity of cross-sectional dimensions and uniformity of density along the length of the loaves is greatly improved over methods presently used.

It is presently common practice to fill molds with food products, cook and chill the loaves, then remove the loaves from the molds for slicing and grouping the slices into groups or stacks of predetermined weights. In this connection, various statutes and regulations require that each group of slices must have the weight specified on the packaging when offered to the consumer. For efficient production, the weights of the stacks of food must not greatly exceed the specified weight. The weight in excess of the specified weight is usually referred to as give-away weight. With modern slicing methods, the give-away can be reduced by producing loaves of uniform density and cross-section along their length. The lids and molds that are normally used allow leakage and loss of moisture at the ends of the loaves such that the dozen or so slices at the ends of the loaves are underwight and the stacks of food formed from these slices will be underweight. They must be manually corrected by adding a partial slice of product or else by adding a thicker slice of product to bring the stack to the required weight. This correction is not only costly labor-wise, but also detracts from the appearance of the product.

The usual methods of producing loaves of food products produce loaves that are not uniform in cross-section and density along the length of the loaves because there are no provisions for maintaining a pressure in the molds while the lids are positioned on the molds. For example, the mold stuffing apparatus shown in Hawley U.S. Pat. No. 3,373,777 has provisions for developing a pressure in the molds as they are being stuffed, but it is not possible to maintain a uniform stuffing pressure along the length of the loaves because considerable clearance is required between the inside of the molds and the rigid type stuffing horn. As the food product is stuffed, considerable pressure is developed in the mold resulting in leakage between the horn and the inside of the mold. To minimize this, the horn is made quite long to icrease the length of the leakage path and therefore reduce the leakage rate. However, as the molds are filled and as the horn nears the filling end of the molds, the leakage path along the horn gradually decreases to zero length, so the leakage near the end of the loaf becomes excessive.

Furthermore, there are no provisions for holding this pressure until the lid is placed on the mold. In operating this apparatus, a mold is placed upon a slidable carriage, the mold is then slid over the stuffing horn, the operator opens a valve in the food supply line to fill the mold, the filled mold is then removed from the apparatus and the lid is manually positioned on the mold.

The instant invention incorporates a flexible horn seal that expands to contact the sides of the molds such that full mold pressure is maintained during the stuffing of the full length of the loaves, and is also maintained while the lids are automatically placed on the molds.

The existing types of molds and lids are not suitable for automatic filling and automatic loading of the lids. Furthermore, they do not provide an adequate seal to prevent leakage of moisture and shrinkage at the ends of the loaves. For example, the molds and lids shown in hawley Pat. No. 3,166,007 and Foldenauer U.S. Patent No. 3,385,202 require manual loading of the lids. Also, both patents show relatively thin plates as sealing members. These plates must of necessity be somewhat smaller than the inside of the mold to allow for manufacturing tolerances and to allow for some denting and bending of the molds that occur in actual use. For example, some of the plates manufactured according to U.S. Pat. No. 3,166,007 are actually ⅛ inch smaller than the inside dimension of the mold. This clearance allows considerable loss of moisture and conseqeuent shrinkage at the ends of the loaves.

Sumption U.S. Pat. No. 3,462,993 discloses an apparatus in which pairs of lids are inserted into a tubular stuffing horn to make separate, flat ended sections of food products. This apparatus must be used with flexible type casings and cannot be used to seal off rigid molds that are required for the types of food products referred to in the instant invention.

An object of this invention is to produce a mold filling method and machine that will greatly reduce the labor required for the filling operation.

Further objects of this invention are to produce a method and mold filling machine that will produce loaves of food product which are very uniform in cross-section and density along the length of the loaves, will reduce the usual shrinkage during cooking and chilling and will increase the amount of food product that can be put into the molds.

A further object of this invention is to produce a mold filling machine that will automatically maintain a predetermined pressure on the food product in the mold during the stuffing operation.

In general, these objects are obtained by a machine having means for automatically introducing a mold release agent to the inner surface of a mold, means for applying a first lid to one end of an empty mold, means for automatically filling the mold with a food product, hereinafter referred to as "food," a means for automatically maintaining a predetermined pressure on the food during the filling operation, and a means for automatically closing the mold while pressure is held on the food product.

This automatic mold filling machine improves the quality of the food loaves and also reduces the labor cost to about 50 percent of the usual mold filling labor cost.

The means by which the objects of this invention are obtained are described more fully with reference to the accompanying drawings in which:

FIG. 1a is an enlarged detail view of a portion of FIG. 1;

FIG. 2 is a side view of the machine, partly shown in section;

FIG. 3 is an enlarged view, partly in cross-section, of a stuffing horn;

FIG. 4 is a view similar to FIG. 3 of a modified horn;

FIG. 4a is a view of a spider used in the inlet end of the horn shown in FIG. 4;

FIG. 4b is an enlarged cross-sectional view of a detail shown in FIG. 4;

FIG. 5 is a front view of an end of a frame for being fitted to an end of a can for holding a cover plate;

FIG. 6 is a cross-sectional view taken on the line 6—6 of FIG. 5;

FIG. 7 is a side view of a cover plate;

FIG. 8 is a cross-sectional detail view of the frame of FIG. 5 secured to a can;

FIG. 9 is a front view of a modified cover;

FIG. 10 is a side view of FIG. 9;

FIG. 11 is a cross-sectional view taken on the line 11—11 of FIG. 9;

FIG. 12 is a partial front view of a further modified form of a flange for holding a cover plate.

Figure 1:
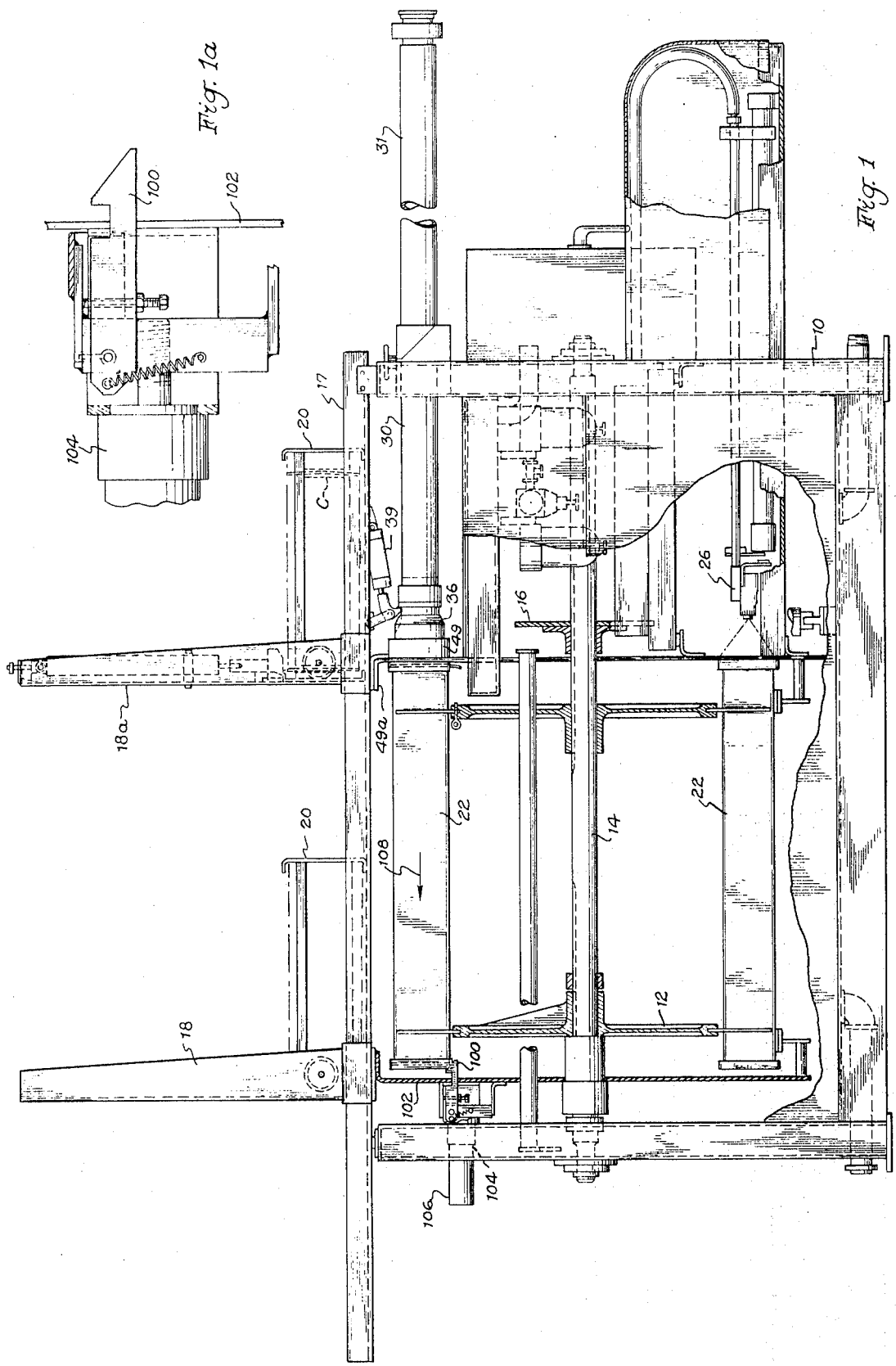
FIG. 1 is a front elevational view of the machine.

As shown in FIG. 1, the machine is composed of a frame 10 in which a reel 12 is rotatably mounted by means of a shaft 14 having an indexing means 16 connected to a suitable conventional motor. On top of the frame is a beam 17 supporting a pair of spaced and similar stands 18 and 18a each of which is associated respectively with lid or cover plate magazines 20. On the reel are molds 22 for receiving the food. At one of the reel indexed positions is a spraying means 26 for spraying the inside walls of an empty mold with liquid releasing oil. Such an oiled mold is indexed by the reel so that it is aligned with a stuffing horn. After the mold has been filled with food and the open end closed by a cover, the filled mold is then indexed by the reel to a further position where it is manually removed from the reel.

As shown in FIGS. 1 and 2, in posts or stands 18, the piston means 27 is mounted over a cover C for driving a cover plate over the end of a mold as will be described more fully with reference to FIGS. 5 to 12.

As shown in FIG. 3, the stuffing horn is composed of an outer tube 30 having at one end a threaded fitting 32 for being attached to a food pump and an inner tube 34 telescoped within the outer tube 30. Sealing rings 34a are secured to inner tube 34 and slide on the inner wall of tube 30 which also provides an end bushing 30a. A block 34b secured to the end of tube 34 within flexible sealing cup 36 serves as a stop for limiting the movement of tube 34 adjacent the far cover in a mold to prevent undue distortion of cup 36. The open end of tube 34 is attached to a flexible cup 36 having on its outer surface ribs 38 which extend parallel to the longitudinal axis of tube 34.

Pneumatically actuated lever and latch means 39 is engageable in a notch on tube 34 to assist the final phase step in the withdrawal of tube 34 from a mold, and holding the tube against advancing food pressure while in starting position.

In the modification of fig. 4, the horn is composed of an outer tube 40 and an inner tube 42 telescoped within tube 40. A threaded fitting 43 is secured to the inlet end of outer tube 40 for attachment to a food pump. A spider 44, FIG. 4a, is mounted on this end of the tube and supports a rod 44a coaxially within the tube. Stop block 44b is slidably mounted on rod 44a and blocks the inlet end of inner tube 42 when the latter approaches its starting position. Bearing ring 42a is secured to tube 42 and slides on the inner wall of tube 40. Tube 40 has a bearing block 40a at its outer end in which tube 42 slides. Tube 40 has a port 40b to which is attached a compressed air hose 40c. Food entering through spider 44 will bear against both bearing ring 42a and block 44b and will start the movement of tube 42 outwardly of tube 40. When block 44b is stopped by nut 44c on rod 44a, the tube 42 is opened to the food pressure, but the friction of the food on the inner wall of the tube 42 prevents the food from actually flowing through the tube until the tube is fully extended and the tube contacts the bottom of mold 22.

To control the food pressure in the mold, compressed air at a suitable predetermined pressure is introduced through port 40b and pushes against seal assembly 42c to reduce the effect of the frictional drag of the food on the tube 42 and the food stuffing pressure against seal assembly 42b. Thus for very stiff food that creates a heavy frictional drag on tube 42, the air pressure admitted through port 40b would be higher than for lighter foods that create less frictional drag.

Figure 4C:
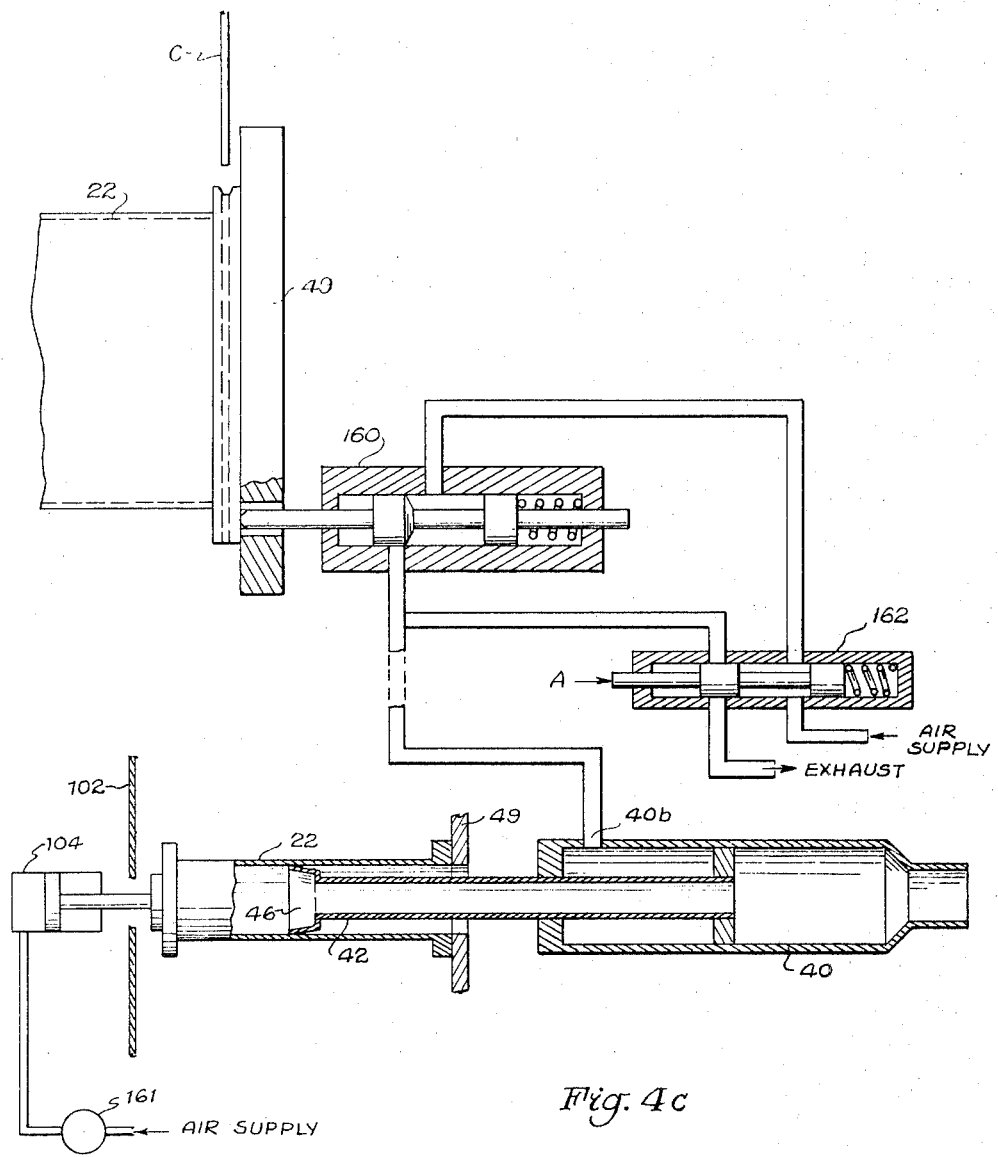
FIG. 4c is a schematic view of the air system and modulating valve used for the operation of the stuffing horn.

When the automatic food pressure system of FIG. 4c is used, the compressed air entering port 40b is modulated in response to valve 160. In this system, regulated compressed air is supplied to holding cylinder 104 through pressure regulator 161. Pressure regulator 161 is set as required to obtain the desired food pressure in the mold. For example, if the cross-sectional area of the food mold is 20 square inches, the holding cylinder cross-sectional area is 5 square inches, and the desired food preswure is 12 pounds per square inch, the regulator 161 would be set at 48 pounds per square inch. Thus, the holding cylinder force will hold the mold against the pressure plate 49 until the pressure of the food in the mold exceeds 12 PSI. When this happens, the mold moves to the left to open modulating valve 160 and admit air to the stuffing horn through port 40b until the pressure against the stuffing horn seal ring 42c is sufficient to reduce the food pressure to 12 PSI. The mold then moves toward the pressure plate 49 and reduces the rate of flow of the air to the stuffing horn. In this manner, the air flow to the stuffing horn is modulated as the mold moves to and from the pressure plate 49 such that when the mold moves to the extreme left position the flow through the modulating valve 160 is maximum, and when the mold is held firmly against the pressure plate 49 the flow is zero. Valve 162 is shown held open by force "A" during the stuffing operation. When the mold is filled force "A" is released to shut off the air supply to valve 160 and exhaust the air from the stuffing horn through port 40b.

Radially directed ports 45 adjacent the outlet end of tube 42 direct food against flexible cup 46 which also has external ribs 48.

As shown in FIG. 4b, a pressure plate 49 is mounted on the end frame 49a fastened to beam 17, FIG. 1. At the end of a filling stroke, cup 36, or 46, bears tightly against plate 49 and extends slightly into the mold 22 to prevent the loss of food pressure in filled mold 22 while the mold is being closed by a cover C, FIG. 2. As the cover C is positioned on the mold 22, the cover compresses the seal enough to move it out of the path of the cover.

As shown in FIGS. 5 to 8 each mold has at both ends a frame 50 welded to the end of the mold. This frame is adapted to fit over the end of a mold 22 by means of a shoulder 52. As shown in FIG. 5, the inner side of the frame outwardly of a mold has a pair of grooves 54 for receiving a cover plate C.

As shown in FIG. 7, the cover plate is composed of a spring metal plate having flat end portions 56 and 58, respectively, and a middle center portion 60. When a cover plate C is driven into the grooves 54 as shown in FIG. 6, the plate 60 of spring metal has its curved portion 60 flattened so it seals the end of the mold to prevent the escape of any significant amount of food. Hole 59 serves to receive a hook to pull the cover from the mold in order to remove a cured loaf therefrom.

In the modification of FIGS. 9 to 11, a cover plate C' is composed of a flat center portion 90 from which depend a pair of side flanges 92. On the inner side of each side flange is mounted a metal leaf spring 94. As shown in FIGS. 10 and 11, each end of a mold has welded thereto a rim 96 for forming a side 96a. When the cover plate C' is driven over the end of the mold, the spring 94 bears tightly against the side 96a of rim 96 so that the cover plate is held firmly on the mold.

In the modification of FIG. 12, the cover plate C'' is a flat metal plate having rounded corners. A flange 98 is secured to the end of a mold 22 and has side grooves 99 and a bottom groove 99a forming a continuous U-shaped groove. Plate C'' is driven down through side grooves 99 and stops with its lower edge seated in bottom groove 99a to tightly seal the mold.

In operation, the reel 12 is first loaded with empty molds 22 which are manually set in brackets on the rim of the reel. The first mold is then sprayed with releasing oil by the means 26. The reel is indexed to bring this mold into alignment with the horn 30. Pivoted hook 100, FIG. 1, then moves to the right, hooks onto the mold 22 and pulls the mold to the left against plate 102 in position for receiving a mold cover plate C, C' or C''. Hook 100 is pivotall connected to the piston rod of holding cylinder 104. Then the piston in stand 18 is activated to drive a cover plate into the end of the mold therebeneath. A clamping cylinder 106 then moves the mold to press the right end of the mold tightly against pressure plate 49 during the stuffing stroke with sufficient pressure to overcome the stuffing force indicated by the arrow 108 caused by the food pressure in the mold. With reference to FIG. 3, when the oiled mold is in the stuffing position the food supply pump is started and the latch means 39 swings to the left and upwardly to release the inner tube 34 such that the inner tube 34 is then advanced into the mold 22 by means of the food pumped into tube 31. The friction of the food on the inner wall of tube 34 along with the food pressure on the inlet end of the inner tube is sufficient to move the tube outwardly of the outer tube while being filled with food. As the cup 36 moves through the mold, the outer edge of the cup is slightly cleared from the inner wall of the mold so that air can escape from the mold. When stop block 34b on tube 34 reaches the cover plate C at the end of the mold the pressure of the food causes the free edge of the cup 36 to expand outwardly as shown in dotted lines in FIG. 3 so that it contacts the inner wall of the mold. The pressure of the food then overcomes the friction between the food and the inner wall of the tube wo that as the mold is being filled the tube 34 will be retracted. When the mold is filled and substantially at the same time the free edge of the cup 36 reaches the end of the mold, the food pump is shut off, the latch means 39 engages the inner tube 34 to hold the tube 34 in its full retracted position, and the piston means in stand 18a is activated so as to drive a closing cover plate C into the end of the filled mold. The reel 12 is then indexed away from the horn 30 and the filled mold then manually removed from the reel. At the same time, a new empty mold previously sprayed with releasing oil is brought into position for filling.

With reference to FIG. 4, when an empty mold is ready for stuffing, the food supply pump is started and the latch means 39 disengages the inner tube 42 such that the inner tube 42 is then advanced into the mold 22 by means of food pumped into the tube 40d against the seal 42b and the block 44b. As the tube 42 extends and the block 44 reaches the cover plate C at the end of the mold, as previously described, a modulated flow of compressed air flows into port 40b to control the food pressure in the mold.

When the mold is filled, and at substantially the same time the free edge of the cup 46 reaches the end of the mold, the block 44b closes off the flow of food into the tube 42, the food pump shuts off and the latch means 39 engages the inner tube 42 to hold the tube 42 in its fully retracted position. Nut 44c can be adjusted as desired to advance or retard the closing of tube 42 as the tube 42 nears its fully retracted position.

The advantages of this invention are first of all in that the food is filled into the mold under pressure. This is made possible by the action of the stuffing horn and by the tight seals given by the cover plates C, C' and C'' shown in FIGS. 5 to 12. The food is tightly packed into the mold using about one-half the amount of labor heretofore needed to spray and fill the molds. The loaves are very uniform in cross-section and density along the length of the molds and therefore the stacks of food which have been sliced from the loaves are much more uniform in weight than ordinary. Due to the pressure in the mold, about 5 to 10 percent more food can be filled into the mold than customary. The tight seals given by the covers C and C' and C'' reduce the normal shrinkage in the luncheon loaves during subsequent cooking.

Figure 13:
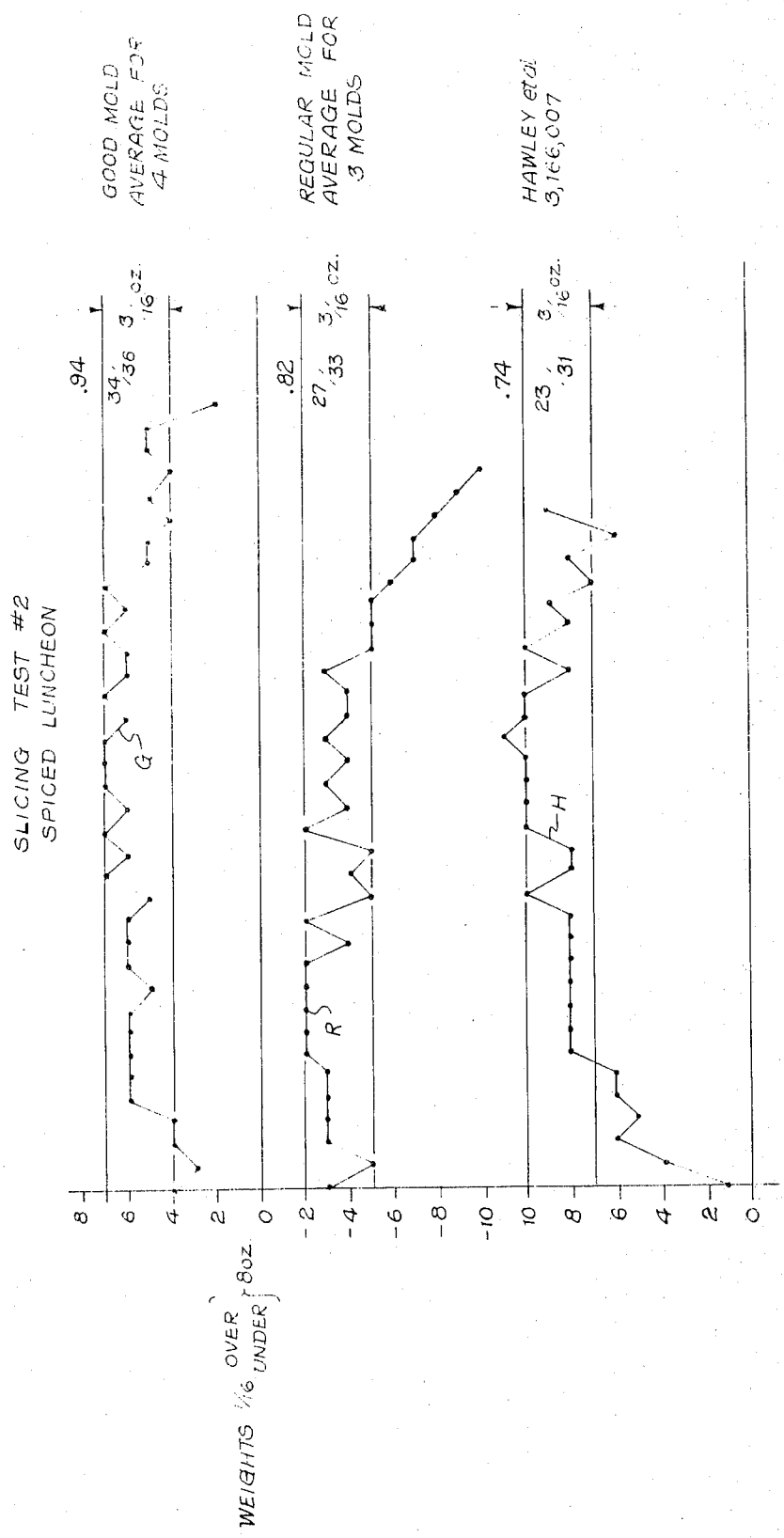
FIG. 13 is a graph showing comparison curves of different methods of stuffing.

A comparison of test results on luncheon meats obtained by this invention with the prior art is given in the curves of FIG. 13. Curve G is according to the instant invention, curve R is for molds ordinarily used by meat process manufacturers and curve H is for the mold of Hawley et al, U.S. Pat. No. 3,166,007. In making loaves of luncheon meat, every effort is made to reduce the give-away in the finished stacks of meat slices ready for sale. Heretofore, considerable shrinkage has been experienced in the luncheon loaves especially at the ends of the loaves because of moisture loss through loose covers. This shrinkage means that at the end of the loaves there are several stacks of meat which are considerably underweight. This requires manual weight correction to bring them to specified weight. The curve G for the mold of the instant invention shows that from the slices obtained from the machine of this invention, 34 stacks of slices out of 36 stacks fell within a 3/16 oz. tolerance. Curve R shows that for regular molds 27 out of 33 stacks were within a 3/16 oz. tolerance, and curve H shows that 23 out of 31 stacks were within this tolerance. Curve R shows extreme shrinkage at the righthand end of regular molds, and curve H shows extreme shrinkage on the lefthand end of the Hawley et al mold.

In addition to the desirability of having accurate weights in the stacks of slices, it is also important that the loaves are dimensionally uniform so that the semi-rigid packaging film will not wrinkle excessively as will occur in luncheon meat stacks which are undersized because of the excessive shrinkage at the ends of the loaves.

Shrinkage measuring tests have shown that the average shrinkage for one hundred regular molds of curve R was 7½ percent, while the average shrinkage for the molds of this invention was 5 percent, which is a 2½ shrinkage savings for this invention. This amounts to a considerable dollar savings when considering the high volume that the normal meat packer processes.

Another advantage is in that, because of the pressure filling of the food into the molds, the molds of this invention can hold from 5 to 10 percent more meat than heretofore used filling methods. This results in an average additional reduction of the whole labor processing costs of about 7½ percent.

Having now described the means by which the objects of this invention are obtained,

I claim:

1. A mold for food products of the type into which a food product is placed under pressure and which is closed while keeping the food product under pressure and the food product is processed in the closed mold; said mold comprising an elongated tubular element having frame means at each end outwardly of the walls of said tubular element, opposed inwardly facing grooves in two opposite sides of at least one of said frame means to receive a closure, a closure for each end of said tubular element, one of said closures being a closure plate adapted to slide across the end of said tubular element with opposite edges of said plate in engagement with said inwardly facing grooves, said closure plate having flat end portions and an arcuate middle portion to provide a tight fit in said opposed grooves, whereby, upon closing said mold with said closure the mold will continue to hold said food product under pressure when said mold and contents are removed from the source of said food product under pressure.

* * * * *